US008755623B2

(12) United States Patent
Du

(10) Patent No.: US 8,755,623 B2
(45) Date of Patent: Jun. 17, 2014

(54) IMAGE ENHANCEMENT METHOD, IMAGE ENHANCEMENT DEVICE, OBJECT DETECTION METHOD, AND OBJECT DETECTION DEVICE

(75) Inventor: Cheng Du, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 300 days.

(21) Appl. No.: 13/089,693

(22) Filed: Apr. 19, 2011

(65) Prior Publication Data

US 2011/0262039 A1 Oct. 27, 2011

(30) Foreign Application Priority Data

Apr. 27, 2010 (CN) .......................... 2010 1 0156837

(51) Int. Cl.
*G06K 9/40* (2006.01)

(52) U.S. Cl.
USPC ............................. 382/254; 382/167; 382/190

(58) Field of Classification Search
USPC .................................. 382/115, 167, 190, 254
See application file for complete search history.

(56) References Cited

U.S. PATENT DOCUMENTS

| 4,602,348 | A * | 7/1986 | Hart ............................... | 382/279 |
|---|---|---|---|---|
| 7,068,841 | B2 * | 6/2006 | Luo ................................ | 382/167 |
| 7,170,638 | B2 * | 1/2007 | Ito .................................. | 358/1.9 |
| 7,466,868 | B2 * | 12/2008 | Wilensky ....................... | 382/254 |
| 7,783,127 | B1 * | 8/2010 | Wilensky ....................... | 382/274 |
| 8,040,428 | B2 * | 10/2011 | Shilston et al. ............... | 348/345 |
| 8,254,643 | B2 * | 8/2012 | Shi et al. ....................... | 382/118 |
| 2002/0097324 | A1 * | 7/2002 | Onuki ............................ | 348/208 |
| 2002/0172419 | A1 * | 11/2002 | Lin et al. ....................... | 382/167 |
| 2003/0223635 | A1 * | 12/2003 | Russon et al. ................ | 382/167 |
| 2006/0285767 | A1 | 12/2006 | Ali | |
| 2007/0258656 | A1 * | 11/2007 | Aarabi .......................... | 382/254 |
| 2010/0074523 | A1 * | 3/2010 | Ishiga ........................... | 382/170 |
| 2011/0262039 | A1 * | 10/2011 | Du ................................ | 382/167 |
| 2012/0213427 | A1 * | 8/2012 | Du ................................ | 382/159 |

FOREIGN PATENT DOCUMENTS

| CN | 1901659 A | 1/2007 |
|---|---|---|
| CN | 101048795 A | 10/2007 |
| WO | WO 2006/046182 A1 | 5/2006 |

OTHER PUBLICATIONS

Combined Chinese Office Action and Search Report issued Feb. 4, 2013 in Patent Application No. 201010156837.7 with English Translation.

* cited by examiner

*Primary Examiner* — Gandhi Thirugnanam
(74) *Attorney, Agent, or Firm* — Oblon, Spivak, McClelland, Maier & Neustadt, L.L.P.

(57) ABSTRACT

Disclosed are an image enhancement method, an image enhancement device, an object detection method, and an object detection device. The image enhancement method comprises steps of (a) letting an input image be a waiting-for-enhancement image and detecting specific objects in the waiting-for-enhancement image; (b) determining, based on an image feature of an object area including the detected specific objects, an image enhancement parameter so that an after-enhancement image enhanced according to the image enhancement parameter points out the image feature; (c) enhancing the waiting-for-enhancement image; (d) detecting the specific objects in the after-enhancement image; and (e) determining whether a predetermined stopping condition is satisfied. If the predetermined stopping condition is satisfied, then the after-enhancement image having a best result of object detection up to now is output; otherwise the after-enhancement image serves as the waiting-for-enhancement image, and steps (b) to (e) are carried out repeatedly.

7 Claims, 7 Drawing Sheets

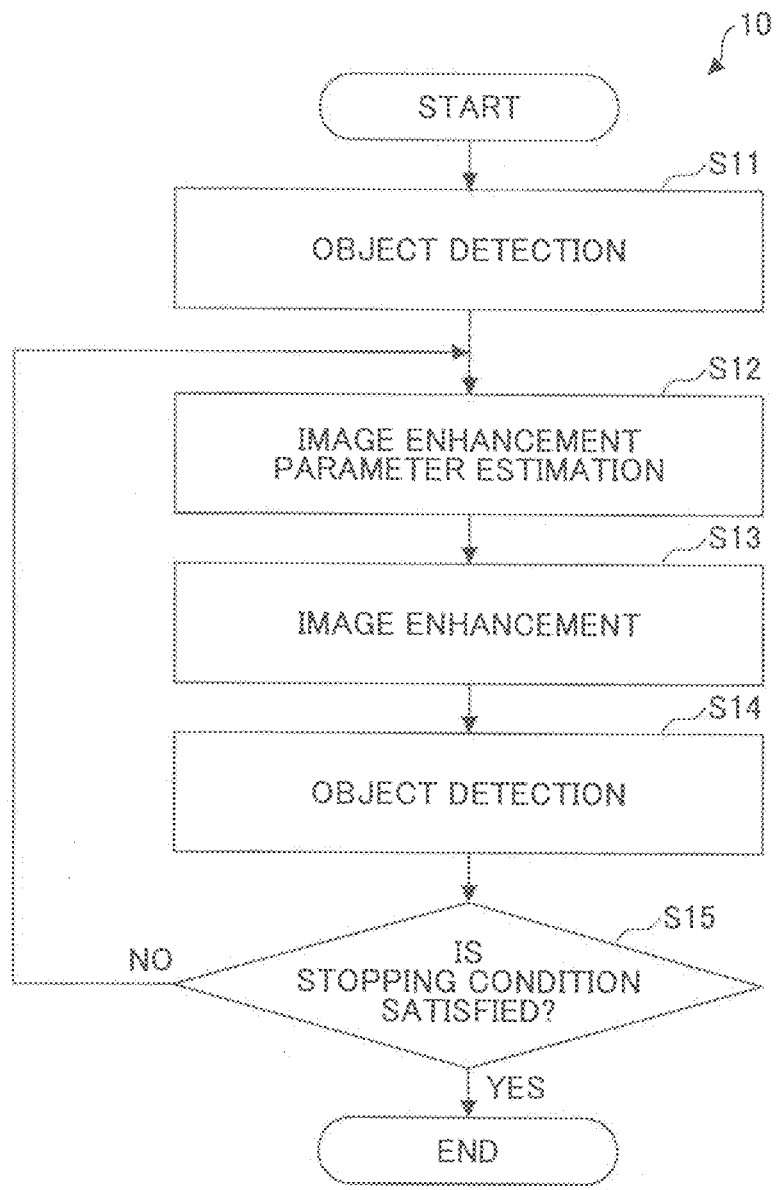

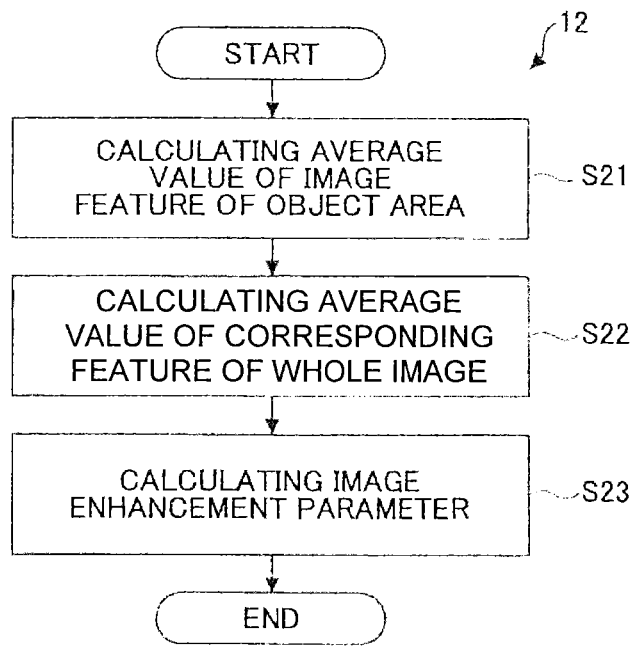
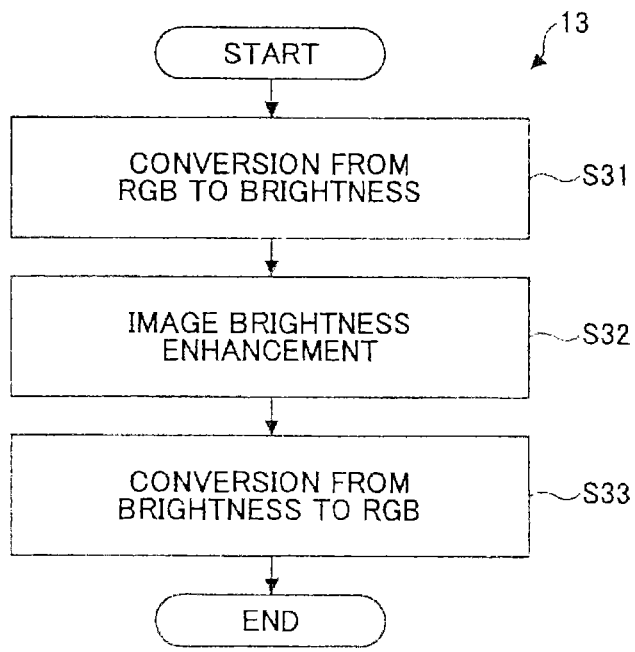

IMAGE ENHANCEMENT METHOD, IMAGE ENHANCEMENT DEVICE, OBJECT DETECTION METHOD, AND OBJECT DETECTION DEVICE

BACKGROUND OF THE INVENTION

1. Field of the Invention

The present invention relates to image processing, and more particularly relates to an image enhancement method, an image enhancement device, an object detection method, and an object detection device.

2. Description of the Related Art

When carrying out image processing such as human face detection, moving object tracing, etc., image enhancement is usually involved.

In general, the image enhancement refers to processing of enhancing user-concerned information in an input image so as to let the input image turn clear from unclear or to emphasize some interesting features and limit some non-interesting ones; in this way, the quality of the input image may be improved, the information amount of the input image may be enriched, and the decipherment and recognition effect of the input image may be increased.

The problem of image quality is a big obstacle for detecting specific objects in an input image. In particular, for example, in a video conference system, it may be necessary to detect the position of a human face in a video image. However, when lighting conditions are not good in a conference room, the brightness problem of image quality may cause the performance of a human face detection algorithm to become diminished. At this time, it may be necessary to improve the image quality.

U.S. Pat. No. 7,068,841 discloses a technique of enhancing an input image based on the position of a human face in the input image. This patent determines an image enhancement curve by comprehensively considering image features of a human face area and the whole image so as to carry out enhancement processing with regard to the input image. However, this patent only concerns acquiring an image having good visual effects in whole by enhancing the input image; in the meantime, this kind of enhanced image may reduce the performance of human face detection.

In an application of object detection such as human face detection, if the quality of a video image is not good, an idea of first improving the quality of the video image, and then carrying out object detection is natural. At this time, the following aspects may be considered.

(1) As for object detection, when is an image enhancement algorithm utilized? Sometimes an image has good quality, and does not need to be enhanced, whereas sometimes an image has bad quality, and needs to be enhanced. As a result, as an input of an image enhancement algorithm, it is difficult to determine which images need to be enhanced and which images do not need to be enhanced.

(2) How to choose a parameter of an image enhancement algorithm? As for the same image enhancement algorithm, different parameters may result in totally different enhanced images. As a result, it is difficult to select a proper parameter of an image enhancement algorithm by which an enhanced image best for an object detection algorithm can be generated.

(3) Conventional image enhancement algorithms generally concentrate in generating an image that looks beautiful. However, an image that looks beautiful does not mean that it is always best for the object detection.

SUMMARY OF THE INVENTION

In order to solve the above described problems, the present invention provides an image enhancement method, an image enhancement device, an object detection method, and an object detection device.

According to one aspect of the present invention, a method of enhancing an input image is provided. The method comprises (a) a step of letting the input image be a waiting-for-enhancement image and detecting one or more specific objects in the waiting-for-enhancement image; (b) a step of determining, based on at least one image feature of an object area including the detected specific objects, at least one image enhancement parameter so that an after-enhancement image enhanced according to the image enhancement parameter points out the image feature of the object area; (c) a step of enhancing the waiting-for-enhancement image based on the determined image enhancement parameter; (d) a step of detecting the specific objects in the after-enhancement image; and (e) a step of determining whether a predetermined stopping condition is satisfied, wherein, if the predetermined stopping condition is satisfied, then the after-enhancement image having a best result of object detection up to now is output, otherwise the after-enhancement image serves as the waiting-for-enhancement image, and steps (b) to (e) are carried out repeatedly.

Furthermore the object area including the detected specific objects may be calculated by letting a position of the detected specific objects be a center, and is different from the whole area of the waiting-for-enhancement image.

Furthermore the object area including the detected specific objects may be a set of areas representing the detected specific objects, respectively.

Furthermore the predetermined stopping condition may be at least one or a combination of the following items: (1) a new specific object cannot be detected in iterations running for a predetermined number of times; (2) the number of the specific objects detected in a current iteration is less than that of the specific objects detected in a previous iteration; and (3) the number of times of iterations reaches a predetermined maximum value.

Furthermore the image feature may be one or a combination of brightness, color, and contrast.

According to another aspect of the present invention, a device for enhancing an input image is provided. The device comprises a first object detection unit used to let the input image be a waiting-for-enhancement image and detect one or more specific objects in the waiting-for-enhancement image; an image enhancement parameter determination unit used to determine, based on at least one image feature of an object area including the detected specific objects, at least one image enhancement parameter so that an after-enhancement image enhanced according to the image enhancement parameter points out the image feature of the object area; an image enhancement unit used to enhance the waiting-for-enhancement image based on the determined image enhancement parameter; a second object detection unit used to detect the specific objects in the after-enhancement image; and a stopping condition determination unit used to determine whether a predetermined stopping condition is satisfied. If the predetermined stopping condition is satisfied, then the after-enhancement image having a best result of object detection up to now is output; otherwise the after-enhancement image serves as the waiting-for-enhancement image, and the detected result of the second object detection unit is output to the image enhancement parameter determination unit for repeatedly carrying out respective operations of the image enhancement determination unit, the image enhancement unit, the second object detection unit, and the stopping condition determination unit.

According to still another aspect of the present invention, a method of detecting one or more specific objects in an input image is provided. The method comprises (a) a step of detecting the specific objects in the input image and letting the input image be a waiting-for-enhancement image; (b) a step of determining, based on at least one image feature of an object area including the detected specific objects, at least one image enhancement parameter so that an after-enhancement image enhanced according to the image enhancement parameter points out the image feature of the area; (c) a step of enhancing the waiting-for-enhancement image based on the determined image enhancement parameter; (d) a step of detecting the specific objects in the after-enhancement image; and (e) a step of determining whether a predetermined stopping condition is satisfied, wherein, if the predetermined stopping condition is satisfied, then a best result of object detection up to now is output, otherwise the after-enhancement image serves as the waiting-for-enhancement image, and steps (b) to (e) are carried out repeatedly.

According to still another aspect of the present invention, a device for detecting one or more specific objects in an input image is provided. The device comprises a first object detection unit used to detect the specific objects in the input image and let the input image be a waiting-for-enhancement image; an image enhancement parameter determination unit used to determine, based on at least one image feature of an object area including the detected specific objects, at least one image enhancement parameter so that an after-enhancement image enhanced according to the image enhancement parameter points out the image feature of the object area; an image enhancement unit used to enhance the waiting-for-enhancement image based on the determined image enhancement parameter; a second object detection unit used to detect the specific objects in the after-enhancement image; and a stopping condition determination unit used to determine whether a predetermined stopping condition is satisfied. If the predetermined stopping condition is satisfied, then a best result of object detection up to now is output; otherwise the after-enhancement image serves as the waiting-for-enhancement image, and the detected result of the second object detection unit is output to the image enhancement parameter determination unit for repeatedly carrying out respective operations of the image enhancement determination unit, the image enhancement unit, the second object detection unit, and the stopping condition determination unit.

By utilizing the image enhancement method, the image enhancement device, the object detection method, and the object detection device, since the image enhancement parameter is determined based on the image feature of the object area including the detected objects, the after-enhancement image is more suitable for the object detection. Furthermore, since the after-enhancement image that is more suitable for the object detection is obtained step by step by using iterations, the best result of the object detection can be obtained.

BRIEF DESCRIPTION OF THE DRAWINGS

FIG. 1 is a flowchart of an image enhancement method according to an embodiment of the present invention.

FIG. 2 is a flowchart of an image enhancement parameter calculation method according to an embodiment of the present invention.

FIG. 3 is a flowchart of image enhancement processing shown in STEP S13 of FIG. 1 according to an embodiment of the present invention.

DETAILED DESCRIPTION OF THE PREFERRED EMBODIMENTS

Figure 4:
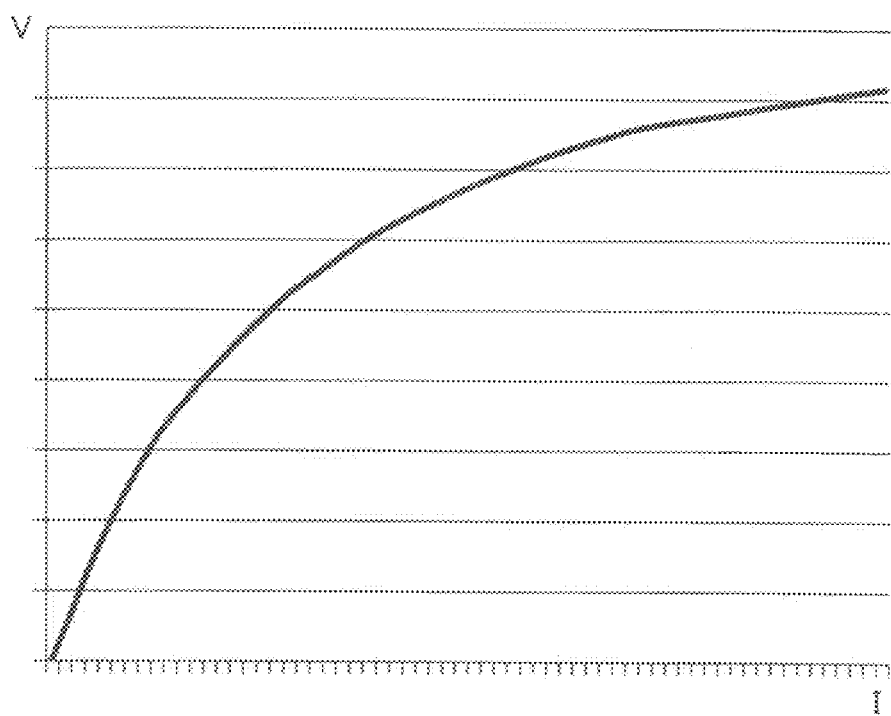
FIG. 4 illustrates an image enhancement mapping curve according to an embodiment of the present invention.

Hereinafter, various embodiments of the present invention will be concretely described with reference to the drawings. Here it should be noted that the same symbols, which are in the specification and the drawings, stand for constructional elements having the same or basically-same function and structure, and repeated explanations for the constructional elements are omitted in the specification.

FIG. 1 is a flowchart of an image enhancement method 10 according to an embodiment of the present invention.

As shown in FIG. 1, the image enhancement method 10 comprises an object detection step S11, an image enhancement parameter estimation step S12, an image enhancement step S13, an object detection step S14, and a stopping condition determination step S15. First an input image (i.e. a waiting-for-enhancement image) is input into the object detection step S11 for detecting one or more specific objects in the input image. Then the image enhancement parameter estimation step S12 determines, based on at least one image feature of an object area including the detected specific objects, at least one image enhancement parameter so that an after-enhancement image enhanced according to the image enhancement parameter points out the image feature of the object area. The image enhancement step S13 enhances the input image based on the determined image enhancement parameter. The object detection step S14 detects the specific objects in the after-enhancement image. The stopping condition determination step S15 determines whether a predetermined stopping condition is satisfied; if satisfied, then the process ends, otherwise it continues. It should be noted that only during the first iteration or loop, the input image is used to carry out the object detection, the parameter estimation, and the image enhancement; in other words, during other loops, the after-enhancement image obtained in a previous loop is employed by the above described steps in a current loop. During the first loop, it may be that the specific objects such as human faces cannot be detected. In this case, the image enhancement parameter estimation step S12 carries out a parameter estimation operation based on the whole input image. That is, even in this case, the image enhancement method 10 according to this embodiment is also effective. The reason is that after one or two loops, the after-enhancement image enhanced by a general method (without any detected object serving as an input) can also improve the image quality at a certain level so that the object detection result can be improved.

In what follows, the above described image enhancement processing (i.e. steps) is illustrated in detail.

In STEP S11 of FIG. 1, specific objects in an input image (i.e. a waiting-for-enhancement image) are detected. Various conventional object detection algorithms such as a detection algorithm based on AdaBoost, a neural network algorithm, a Markov model algorithm, an algorithm based on statistics, etc., may be utilized in this step. In an example, as for human face detection, the detection algorithm based on AdaBoost is utilized, wherein, a multi-stage classifier structure and Haar image features are used. In addition, as for the human face detection, it is possible to utilize an Eigenface algorithm, etc. All these algorithms are well-know techniques in the art.

In STEP S12 of FIG. 1, at least one image enhancement parameter is determined based on at least one image feature of an object area including the detected specific objects so that an after-enhancement image enhanced according to the image enhancement parameter points out the image feature of the object area. This operation is mainly based on the following thinking. That is, in an image, image features of various object areas are similar, and these image features are different from the corresponding feature of the whole image; as a result, image enhancement carried out according to an image feature of a detected object area can often improve the image quality of other undetected object areas at the same time. In view of this, the after-enhancement image is useful for detecting the specific objects that were not detected before.

In particular, for example, as for a human face in an image, usually it has the following features.

Figure 5:
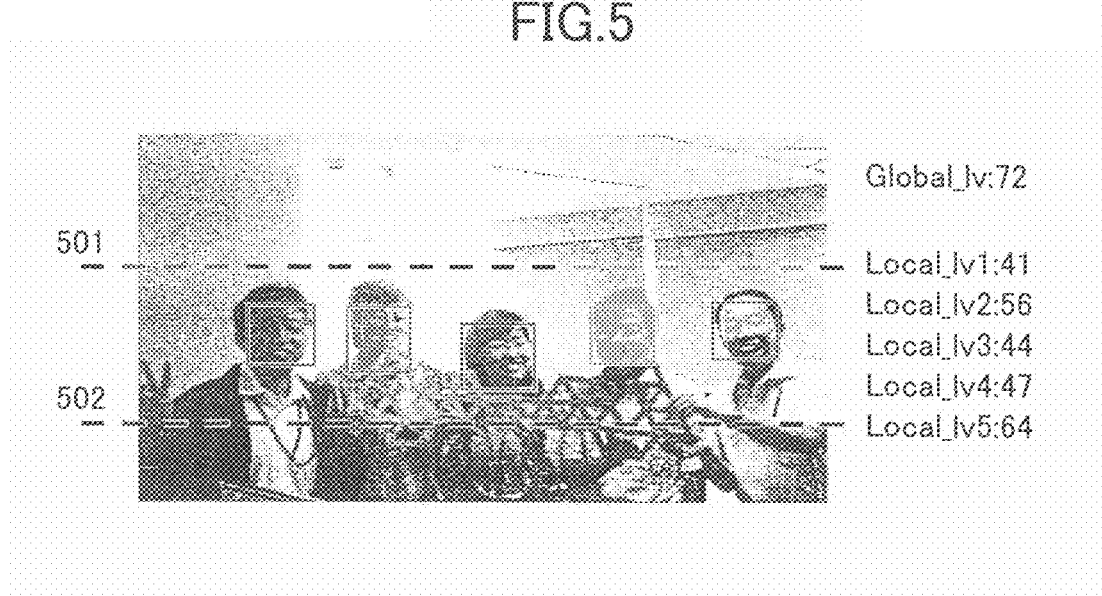
FIG. 5 illustrates an image used to explain an image feature when carrying out human face detection according to an embodiment of the present invention.

(1) Image features such as brightness, texture, color, and contrast, of various human faces in the image are similar, and the image features are different from the corresponding features of the whole image. For example, FIG. 5 illustrates an image used to explain a human face feature, wherein, average values of brightness of five human faces from left to right are Local_lv1: 41, Local_lv2: 56, Local_lv3: 44, Local_lv4: 47, and Local_lv5: 64, whereas an average value of brightness of the whole image is Globle_lv: 72. As a result, it is apparent that the average brightness values of the respective human faces are almost the same, and are totally different from the average brightness value of the whole image.

(2) In the image, various human faces are often located at the same horizontal area; for example, in FIG. 5, all the human faces are located between two horizontal lines 501 and 502. As a result, it is possible to carry out image enhancement based on at least one image feature of this horizontal area; compared to image enhancement carried out based on the corresponding feature of the whole image, the image quality of the human face area can be more effectively improved.

Consequently, in a case of human face detection, it is possible to determine an object area including one or more detected human faces as follows.

(1) The object area is a set of areas representing all human faces; for example, in FIG. 5, if the respective human faces are presented by five rectangles, then the object area is a set of those five rectangles. At this time, when calculating an image feature of the object area, it is possible to sum the corresponding image features of those five rectangles, for example, sum brightness values of those five rectangles, and then obtain the average brightness value local_lv by dividing the sum of the brightness values by the area of those five rectangles. However, as is known in the art, it is also possible to use an ellipse to present a human face area; in this case, the image feature of the object area can be obtained by using the corresponding image features of various ellipses representing human faces. Here it should be noted that the present invention is not limited to the rectangle or the ellipse when defining the human face area.

(2) The object area is a horizontal area including all the human faces; for example, a horizontal area between two horizontal lines 501 and 502 as shown in FIG. 5. Then an image feature, for example, the average value of brightness local_lv of the object area, is calculated. Of course, it is possible to use a circle surrounding all the human faces to serve as the object area for calculating the image feature. In addition, at this time, it is also possible to carry out image enhancement only with regard to the horizontal area or the circle area instead of the whole image. Here it should be noted that the present invention is not limited to the horizontal area or the circle area when defining the object area.

Furthermore, in a case of human face detection, if the number of persons is large, and the persons are located at various areas group by group, then it is possible to carry out group processing with regard to the respective human faces. That is, the human faces whose positions are close are grouped, and then a set of the grouped areas serves as the above-mentioned object area. In this case, an image feature of the object area can be obtained by using the corresponding image features of the grouped areas. This is best for a case where there are plural scattered groups of persons who sit or stand.

In addition, the object area including the detected specific objects may be calculated by letting a position of the detected specific objects be a center, and may be different from the whole image area. For example, it is possible to let the average coordinates of all the detected specific objects be the center so as to calculate distances along a vertical direction of the respective detected specific objects with regard to the center, then determine two horizontal lines above and below the center by using a maximum distance along the vertical direction, and then let an area between the two horizontal lines be the object area. This is best for a case of human face detection.

Furthermore it is possible to determine the object area by considering various application cases. For example, in a case of a video conference system, in general, persons are not able to stay under a table; as a result, usually there are not human faces in a one-third area from the bottom of an image. At this time, it is possible to remove the one-third area of the image from a possible object area. And at this time, it is possible not to carry out image enhancement with regard to the one-third area of the image.

Here it should be noted that the above described methods of determining the object area including the detected specific objects are only examples, and the present invention is not limited to those methods. As to how to determine the object area including the detected specific objects, there are no special limits; it is possible to carry out various modifications based on application demands, complexity demands, accuracy demands, etc.

After the object area including the detected specific objects is determined, it is possible to determine at least one image enhancement parameter based on the image feature of the object area.

Algorithms chosen for determining the image enhancement parameter are different as image enhancement algorithms and demands are different. In what follows, a method of calculating the image enhancement parameter is illustrated by referring to FIG. 2.

FIG. 2 is a flowchart of an image enhancement parameter calculation method that may be used in STEP S12 of FIG. 1.

As for FIG. 2, in STEP S21, the average value of at least one image feature of an object area is calculated; in STEP S22, the average value of the corresponding image feature of the whole image is calculated; and in STEP S23, at least one image enhancement parameter is calculated based on the two average values of the image feature.

In particular, in a case where an image enhancement algorithm is a global image tone mapping algorithm, the average brightness value local_lv of an object area and the average brightness value global_lv of the whole image are estimated. Then, for example, it is possible to adjust an image enhancement parameter according to the following equation (1).

$$f' = f \times (global\_lv / local\_lv) \quad (1)$$

Here f is a predetermined parameter used to control the overall brightness of a finally enhanced image, and the bigger f is, the brighter the enhanced image is; f' is an adjusted image enhancement parameter according to an embodiment of the present invention.

The thinking of utilizing the above equation (1) is as follows. If the average brightness value global_lv of the whole image is greater than the average brightness value local_lv of the object area, that means the brightness of the object area is not enough, then the parameter f is increased so as to further increase the brightness of the object area; this is helpful for object detection. On the contrary, if the average brightness value global_lv of the whole image is less than the average brightness value local_lv of the object area, that means the brightness of the object area may be is too high; then the parameter f is decreased so as to decrease the brightness of the object area.

Here it should be noted that in the above method of determining the image enhancement parameter described by referring to FIG. 2, both the image feature of the object area and the image feature of the whole image are utilized. However, as described below, it is also possible to utilize only the image feature of the object area when determining the image enhancement parameter.

Then, in STEP S13 of FIG. 1, the waiting-for-enhancement image is enhanced according to the determined image enhancement parameter. Concrete operations are different as image enhancement algorithms are different.

For example, in a case where an image enhancement algorithm is a global image tone mapping algorithm, a flowchart of an image enhancement method is as shown in FIG. 3.

In STEP S31 of FIG. 3, a color image (i.e. an input image) is converted to a grayscale image by utilizing the following equation (2).

$$I(x, y) = \frac{R(x, y) + G(x, y) + B(x, y)}{3} \quad (2)$$

Here I(x,y) refers to the brightness value of a pixel whose position is (x,y) in the image.

In STEP S32 of FIG. 3, the image brightness is enhanced; for example, tone mapping processing is carried out with regard to the grayscale image based on, for example, the following equation (3). FIG. 4 illustrates a tone mapping curve (i.e. an image enhancement mapping curve) corresponding to equation (3). It should be noted that, according to another embodiment, tone conversion processing may be applied to the whole image, or in a case of human face detection, it may be applied to a horizontal area whose center is a position of detected human faces as described above.

$$V(x, y) = \frac{I(x, y)}{I(x, y) + \sigma(I_a)} V_{max} \quad (3)$$

Here V(x,y) refers to the brightness value of a pixel whose position is (x,y) in the enhanced image. $V_{max}$ refers to the maximum brightness value of the enhanced image; as for an image in which each channel has 8 bits, $V_{max}$ is 255 in general. $I_a$ refers to an image adaptive parameter, and may be calculated by using the following equation (4).

$$I_a = \frac{\sum \log(I_{x,y})}{N} \quad (4)$$

Furthermore $\sigma(I_a)$ in equation (3) may be calculated by using the following equations (5) to (7).

$$\sigma(I_a) = (e^{-f} I_a)^m \quad (5)$$

$$m = 0.3 + 0.7 k^{14} \quad (6)$$

$$k = \frac{I_{max} - I_{av}}{I_{max} - I_{min}} \quad (7)$$

The parameter f in equation (5) is, for example, the calculated image enhancement parameter in STEP S12 of FIG. 1; the bigger f is, the brighter the enhanced image is. $I_{max}$ and $I_{min}$ are the maximum and minimum brightness value of the input image.

In STEP S33 of FIG. 3, the enhanced grayscale image is converted to a color image based on the following equations (8) to (10).

$$R'(x, y) = \frac{V(x, y)}{I(x, y)} \times R(x, y) \quad (8)$$

$$G'(x, y) = \frac{V(x, y)}{I(x, y)} \times G(x, y) \quad (9)$$

$$B'(x, y) = \frac{V(x, y)}{I(x, y)} \times B(x, y) \quad (10)$$

Here R(x, y), G(x, y), B(x, y), R'(x, y), G'(x, y), and B'(x,y) corresponds to pixel values of R, G, and B channels in the before-enhancement and after-enhancement color image.

According to the above described operations, the after-enhancement image is obtained.

Next, in STEP S14 of FIG. 1, object detection processing is carried out with regard to the after-enhancement image as done in STEP S11 of FIG. 1.

Then, in STEP S15, it is determined whether a predetermined stopping condition is satisfied; if the predetermined stopping condition is satisfied, then the after-enhancement image having a best result of the object detection up to now is output; otherwise the after-enhancement image serves as the waiting-for-enhancement image and the image enhancement processing goes back to STEP S12 to carry out a new iteration. Here, as for the after-enhancement image having the best result of the object detection up to now, for example, in a case where four iterations are run, if two objects are detected from the after-enhancement image during the first iteration, three objects are detected from the after-enhancement image during the second iteration, five objects are detected from the after-enhancement image during the third iteration, and four objects are detected from the after-enhancement image during the fourth iteration, then the after-enhancement image having the best result of the object detection up to now is the after-enhancement image enhanced during the third iteration.

The predetermined stopping condition may be one or a combination of the following items.

(1) A new specific object cannot be detected in iterations running for a predetermined number of times.

(2) The number of the specific objects detected in a current iteration is less than that of the specific objects detected in a previous iteration.

(3) The number of times of iterations reaches a predetermined maximum value.

Here it should be noted that the above described predetermined stopping conditions are only examples; the present invention is not limited to those predetermined stopping conditions. Predetermined stopping conditions may be different as applications, etc., are different. For example, in a case of conducting a video conference, if there are only three persons taking part in the conference, then it is possible to stop the image enhancing processing when three persons are detected.

Up to here, the image enhancement algorithm has been illustrated according to the embodiment of the present invention. In this image enhancement algorithm, in order to improve the result of the object detection, the input image is enhanced based on at least one image feature of the object area including one or more detected specific objects; in this way, a good result of the object detection can be obtained from the after-enhancement image. In addition, this image enhancement algorithm utilizes iterations to enhance the image step by step; in this way, the result of the objection detection can be improved step by step too.

Figure 6:
FIG. 6 illustrates an initial image and a human face detection result according to an embodiment of the present invention.
Figure 7:
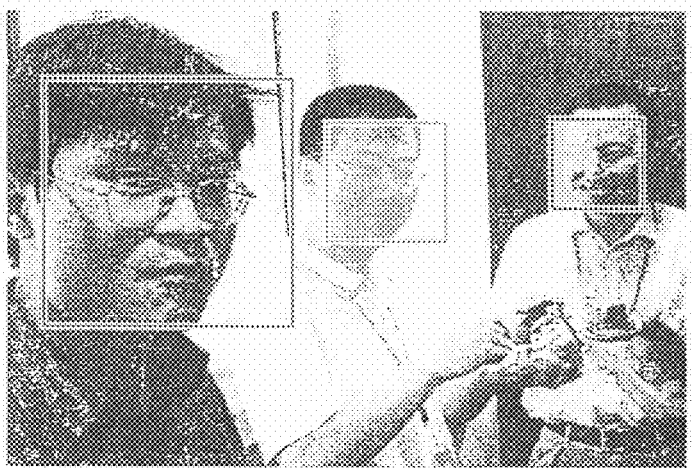
FIG. 7 illustrates an after-enhancement image and a human face detection result according to an embodiment of the present invention.

FIG. 6 illustrates an initial image (i.e. an image without image enhancement processing) and a human face detection result obtained by carrying out human face detection with regard to the initial image. FIG. 7 illustrates an after-enhancement image enhanced by the above described image enhancement algorithm and a human face detection result obtained by carrying out human face detection with regard to the after-enhancement image. It is apparent according to FIG. 6 and FIG. 7 that the image enhancement algorithm according to the embodiment of the present invention can improve the result of the object detection.

In addition, it should be noted that the parameter and the related image feature in STEP S12 of FIG. 1 as well as the concrete image enhancement operations in STEP 13 of FIG. 1 are made different as adopted image enhancement algorithms are different. In the above examples, the global image tone mapping algorithm is adopted; as a result, the related image feature for estimating the parameter is brightness, and the parameter f is determined by using equation (5). However, in a case where other image enhancement algorithms are adopted, the related image feature may be different, for example, may be one or a combination of brightness, color, and contrast; at the same time, the adjusted parameter and the adopted equation are different too.

In what follows, as an example, another image enhancement algorithm is given for illustrating that the image enhancement parameter and the adopted parameter determination equation may vary, and the related image feature of the object area including the detected specific objects may also vary.

Different from the image enhancement equation (3) adopted in the above described image tone mapping algorithm, the other image enhancement algorithm utilizes the following equation (11) to calculate the brightness values of the enhanced image.

$$V(x, y) = \frac{V_{max}}{\log_{10}(I_{max} + 1)} \cdot \frac{\log(I(x, y) + 1)}{\log\left(2 + \left(\left(\frac{I(x, y)}{I_{max}}\right)^{\frac{\log(b)}{\log(0.5)}}\right) \cdot 8\right)} \quad (11)$$

Here the parameter b may serve as the estimated image enhancement parameter in STEP S12 of FIG. 1, and may be determined, based on an image feature such as the average brightness value local_lv of an object area including detected specific objects, by adopting the following equation (12).

$$b = 0.8 + (\text{local\_lv}/100) \quad (12)$$

The smaller the parameter b is, the brighter the enhanced image is.

In another example, it is possible to determine, based on image features such as the average brightness value local_lv and the average contrast value local_contrast, the image enhancement parameter b by utilizing the following equation (13).

$$b = 0.7 + (\text{local\_lv}/100) + (\text{local\_contrast}/300) \quad (13)$$

Here local_contrast is the average contrast value of the object area including the detected specific objects, and may be calculated by using the following equation (14).

$$\text{local\_contrast} = \frac{\sum_{object\_area} |I(x, y) - \text{local\_lv}|}{\text{Pixel\_Number}_{object\_area}} \quad (14)$$

Here object_area refers to the object area including the detected specific objects, and Pixel_Number$_{object\_area}$ refers to the number of pixels in this area.

As a result, it is apparent that the image enhancement parameter and the determination equation vary.

In addition, in the above examples, a case where the image feature of the object area includes brightness and contrast is illustrated. However, it is apparent that in a case where texture and color of the image are of concern, the image feature may include the texture and/or the color too.

Furthermore, in the above concretely described embodiments, the image enhancement method and the object detection method are illustrated by letting human face detection be an example. However, it should be noted that the human face detection is only an example; the present invention is not limited to this. In other words, when carrying out detection of any other specific objects such as human beings, moving objects, human eyes, buildings, trees, etc., it is possible to utilize the image enhancement method and the object detection method as well as the corresponding devices according to the embodiments of the present invention to carry out the detection.

Figure 8:
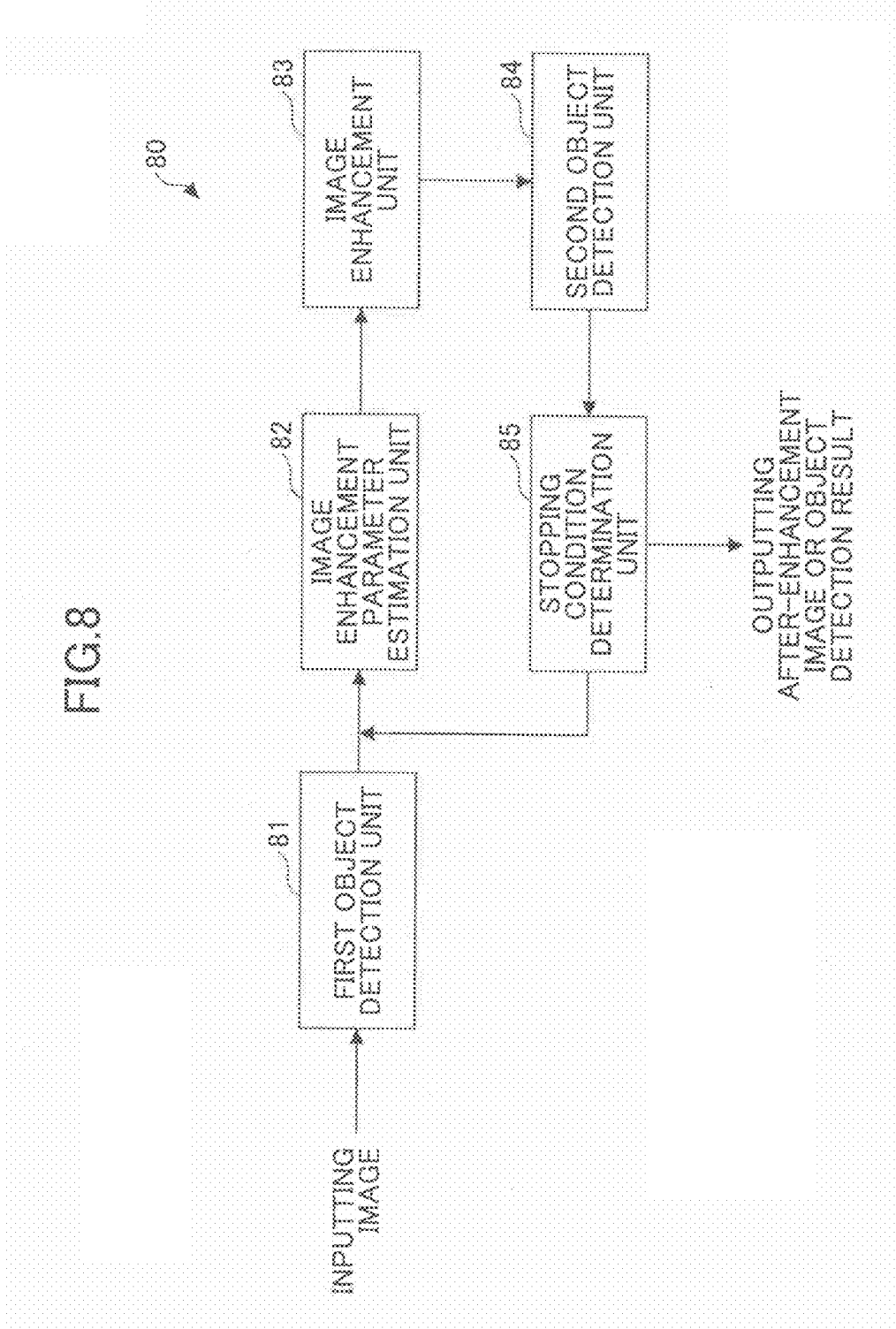
FIG. 8 is a block diagram of an image enhancement device according to an embodiment of the present invention.

FIG. 8 is a block diagram of an image enhancement device 80 according to an embodiment of the present invention.

As shown in FIG. 8, the image enhancement device 80 comprises a first object detection unit 81 used to let an input image be a waiting-for-enhancement image and detect one or more specific objects in the waiting-for-enhancement image; an image enhancement parameter determination unit 82 used to determine, based on at least one image feature of an object area including the detected specific objects, an image enhancement parameter so that an after-enhancement image enhanced according to the image enhancement parameter points out the image feature of the object area; an image enhancement unit 83 used to enhance the waiting-for-enhancement image based on the determined image enhancement parameter; a second object detection unit 84 used to detect the specific objects in the after-enhancement image; and a stopping condition determination unit 85 used to determine whether a predetermined stopping condition is satisfied. If the predetermined stopping condition is satisfied, then the after-enhancement image having a best result of object detection up to now is output; otherwise the after-enhancement image serves as the waiting-for-enhancement image, and the detection result of the second detection unit is output to the image enhancement parameter determination unit 82 so as to repeatedly carry out respective operations of the image enhancement parameter determination unit 82, the image enhancement unit 83, the second detection unit 84, and the stopping condition determination unit 85. Here it should be noted that the first object detection unit 81 and the second object detection unit 82 may be the same unit or separate units.

According to another embodiment of the present invention, a method of detecting one or more specific objects in an input image is provided. The method comprises (a) a step of detecting the specific objects in the input image and letting the input image be a waiting-for-enhancement image; (b) a step of determining, based on at least one image feature of an object area including the detected specific objects, at least one image enhancement parameter so that an after-enhancement image enhanced according to the image enhancement parameter points out the image feature of the object area; (c) a step of enhancing the waiting-for-enhancement image based on the determined image enhancement parameter; (d) a step of detecting the specific objects in the after-enhancement image; and (e) a step of determining whether a predetermined stopping condition is satisfied; wherein, if the predetermined stopping condition is satisfied, then a best result of object detection up to now is output, otherwise the after-enhancement image serves as the waiting-for-enhancement image, and steps (b) to (e) are carried out repeatedly.

In other words, in order to improve the result of object detection carried out with regard to an input image, the input image is enhanced by utilizing the above described object detection method; then, by detecting one or more specific objects in the after-enhancement image, it is possible to determine whether the enhanced image is helpful to the object detection; and then it is possible to determine whether the enhanced image is used for carrying out the objection detection. As a result, it is possible to adaptively determine whether and when an image enhancement algorithm is used, and by enhancing and detecting the specific objects, it is possible to obtain a best result of the object detection step by step.

According to another embodiment of the present invention, a device for detecting one or more specific objects in an input image is provided. The device comprises a first object detection unit used to detect the specific objects in the input image and let the input image be a waiting-for-enhancement image; an image enhancement parameter determination unit used to determine, based on at least one image feature of an object area including the detected specific objects, at least one image enhancement parameter so that an after-enhancement image enhanced according to the image enhancement parameter points out the image feature of the object area; an image enhancement unit used to enhance the waiting-for-enhancement image based on the determined image enhancement parameter; a second object detection unit used to detect the specific objects in the after-enhancement image; and a stopping condition determination unit used to determine whether a predetermined stopping condition is satisfied. If the predetermined stopping condition is satisfied, then a best result of object detection up to now is output; otherwise the after-enhancement image serves as the waiting-for-enhancement image, and the detected result of the second object detection unit is output to the image enhancement parameter determination unit for repeatedly carrying out respective operations of the image enhancement parameter determination unit, the image enhancement unit, the second object detection unit, and the stopping condition determination unit.

In addition, it should be noted that the embodiments of the present invention may be realized by hardware, software, firmware, or their combination; however, the present invention is not limited to these approaches.

Figure 9:
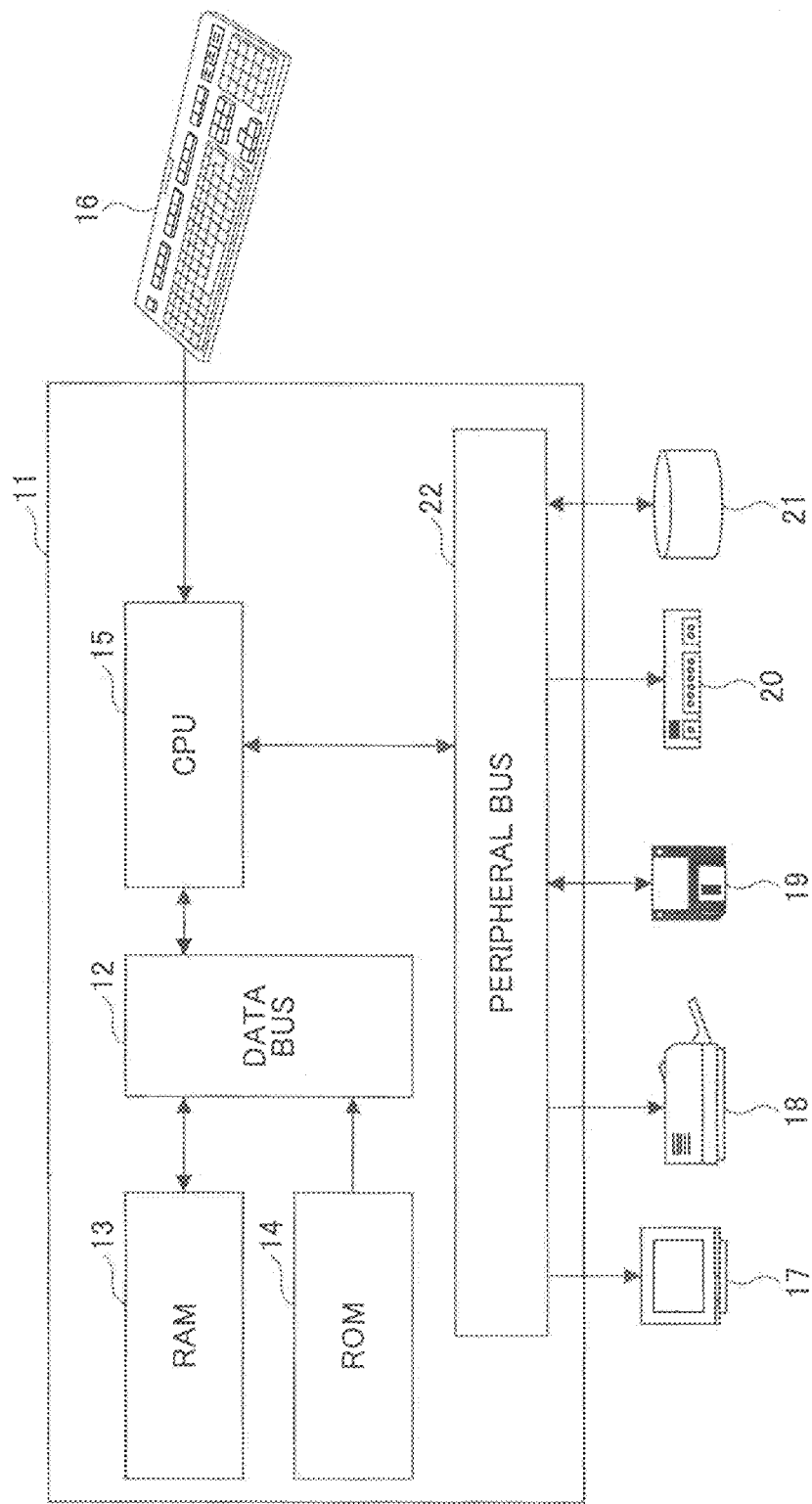
FIG. 9 illustrates a computer system according to an embodiment of the present invention.

FIG. 9 illustrates a computer system according to an embodiment of the present invention.

As shown in FIG. 9, an image enhancement computer system, which can improve the performance of object detection, comprises a main body 11, a keyboard 16, a monitor 17, a printer 18, a floppy disk drive 19, a network access unit 20, and a hard disk drive 21. The main body 11 comprises a data bus 12, a random access memory (RAM) 13, a read-only memory (ROM) 14, a central processing unit (CPU) 15, and a peripheral bus 22.

According to instructions from the RAM 13, the CPU 15 controls receiving and processing of input data, and outputs data to the monitor 17 or other peripheral devices. In this embodiment, a function of the CPU 15 is processing an input image, enhancing the input image, and detecting specific objects in the enhanced image. The enhanced image and the detected positions of the specific objects may be utilized by other application programs.

The CPU 15 accesses the RAM 13 and the ROM 14 via the data bus 12. The RAM 13 serves as a readable and writable memory for use of the CPU 15, and serves as a working zone and a mutable data storage zone. The ROM 14 stores a waiting-for-enhancement image, detected positions of specific objects, after-enhancement images, an image enhancement program, and other application programs.

The peripheral bus 22 is used for accessing peripheral devices such as input devices, output devices, storage devices, and the like, connected to the main body 11. In this embodiment, the peripheral devices include the monitor 17, the printer 18, the floppy disk drive 19, the network access unit 20, and the hard disk drive 21. The monitor 17 is used to display data and images output from the CPU 15 via the peripheral bus 22; it may be a grid display such as CRT or a LCD display. The printer 18 is used to print data and images output from the CPU 15 onto a paper or a medium like a paper. The floppy disk drive 19 and the hard disk drive 21 are used to store an input image, after-enhancement images, and object detection results. By using the floppy disk drive 19, images may be used in various computers. The storage space of the hard disk drive 21 is larger, and its accessing speed is faster. Other storage devices such as flash memories, etc., may also store images for use of the computer system. The computer system may send or receive data to or from other computer systems via networks by using the network access unit 20. A user may input instructions to the computer system by using the keyboard 16.

While the present invention is described with reference to the specific embodiments chosen for purpose of illustration, it should be apparent that the present invention is not limited to these embodiments, but numerous modifications could be made thereto by those skilled in the art without departing from the basic concept and scope of the present invention.

The present application is based on Chinese Priority Patent Application No. 201010156837.7 filed on Apr. 27, 2010, the entire contents of which are hereby incorporated by reference.

What is claimed is:

1. A method of enhancing an input image, comprising:
   first detecting one or more specific objects of a plurality of objects in a waiting-for-enhancement image, the waiting-for-enhancement image being the input image;
   first determining, based on at least one image feature of an object area including the one or more detected specific objects, at least one image enhancement parameter so that an after-enhancement image enhanced according to the image enhancement parameter points out the image feature of the object area, the object area including the detected specific objects is calculated based on a center position, the center position being calculated based on a plurality of positions of the detected specific objects, and the object area being different from a whole area of the waiting-for-enhancement image;
   enhancing the waiting-for-enhancement image based on the determined image enhancement parameter to generate the after-enhancement image;
   second detecting the one or more specific objects or additional objects of the plurality of objects in the after-enhancement image;
   second determining whether a predetermined stopping condition is satisfied;
   outputting, in response to the predetermined stopping condition being satisfied, an after-enhancement image having a best result of object detection; and
   repeating the first determining, the enhancing, the second detecting, and the second determining, with the after-enhancement image serving as the waiting-for-enhancement image, in response to the predetermined stopping condition not being satisfied.

2. The method according to claim 1, wherein the object area including the detected specific objects is a set of areas representing the detected specific objects.

3. The method according to claim 1, wherein the predetermined stopping condition is one or a combination of: a new specific object not being detected in iterations running for a predetermined number of times, a number of the specific objects detected in a current iteration being less than the number of specific objects detected in a previous iteration, and the number of times of iterations reaching a predetermined maximum value.

4. The method according to claim 1, wherein the image feature is one or a combination of brightness, color, and contrast.

5. A device for enhancing an input image, comprising:
   a first object detection processing circuit configured to detect one or more specific objects of a plurality of objects in a waiting-for-enhancement image, the waiting-for-enhancement image being the input image;
   an image enhancement parameter determination processing circuit configured to determine, based on at least one image feature of an object area including the one or more detected specific objects, at least one image enhancement parameter so that an after-enhancement image enhanced according to the image enhancement parameter points out the image feature of the object area, the object area including the detected specific objects is calculated based on a center position, the center position being calculated based on a plurality of positions of the detected specific objects, and the object area being different from the whole area of the waiting-for-enhancement image;
   an image enhancement processing circuit configured to generate the after-enhancement image by enhancing the waiting-for-enhancement image based on the determined image enhancement parameter;
   a second object detection processing circuit configured to detect the one or more specific objects or additional objects in the plurality of objects in the after-enhancement image; and
   a stopping condition determination processing circuit configured to determine whether a predetermined stopping condition is satisfied, wherein, in response to the predetermined stopping condition being satisfied, an after-enhancement image having a best result of object detection is output, and in response to the predetermined stopping condition not being satisfied, the stopping condition determination processing circuit repeats, with the after-image serving as the waiting-for-enhancement image, the respective operations of the image enhancement determination processing circuit, the image enhancement processing circuit, the second object detection processing circuit, and the stopping condition determination processing circuit.

6. The device according to claim 5, wherein the predetermined stopping condition is one or a combination of: a new specific object not being detected in iterations running for a predetermined number of times, a number of the specific objects detected in a current iteration being less than the number of specific objects detected in a previous iteration, and the number of times of iterations reaching a predetermined maximum value.

7. A method of detecting one or more specific objects in an input image, comprising:
   first detecting the one or more specific objects of a plurality of objects in the input image, the input image being a waiting-for-enhancement image;
   first determining, based on at least one image feature of an object area including the one or more detected specific objects, at least one image enhancement parameter so that an after-enhancement image enhanced according to the image enhancement parameter points out the image feature of the object area, the object area including the detected specific objects is calculated based on a center position, the center position being calculated based on a plurality of positions of the detected specific objects, and the object area being different from a whole area of the waiting-for-enhancement image;
   enhancing the waiting-for-enhancement image based on the determined image enhancement parameter to generate the after-enhancement image;
   second detecting the one or more specific objects or additional objects of the plurality of objects in the after-enhancement image;
   second determining whether a predetermined stopping condition is satisfied;
   outputting, in response to the predetermined stopping condition being satisfied, an after-enhancement image having a best result of object detection; and
   repeating the first determining, the enhancing, the second detecting, and the second determining, with the after-enhancement image serving as the waiting-for-enhancement image, in response to the predetermined stopping condition not being satisfied.

* * * * *